(12) United States Patent
Felix et al.

(10) Patent No.: US 7,989,513 B2
(45) Date of Patent: *Aug. 2, 2011

(54) PROCESS FOR PRODUCING DISPERSIONS OF HIGHLY FLUORINATED POLYMERS

(75) Inventors: Vinci Martinez Felix, Kennett Square, PA (US); Kelly D. Barton, Athens, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 887 days.

This patent is subject to a terminal disclaimer.

(21) Appl. No.: 11/955,521

(22) Filed: Dec. 13, 2007

(65) Prior Publication Data

US 2008/0160351 A1    Jul. 3, 2008

Related U.S. Application Data

(60) Provisional application No. 60/875,944, filed on Dec. 20, 2006.

(51) Int. Cl.
*C08J 5/20* (2006.01)
*C08L 27/12* (2006.01)

(52) U.S. Cl. .......................... 521/28; 524/544

(58) Field of Classification Search ............ 521/28; 524/544

See application file for complete search history.

(56) References Cited

U.S. PATENT DOCUMENTS

| | | | |
|---|---|---|---|
| 3,282,875 A | 11/1966 | Connolly et al. | |
| 4,358,545 A | 11/1982 | Ezzell et al. | |
| 4,433,082 A * | 2/1984 | Grot | 524/544 |
| 4,940,525 A | 7/1990 | Ezzell et al. | |
| 5,547,551 A | 8/1996 | Bahar et al. | |
| 6,110,333 A | 8/2000 | Spethmann et al. | |
| 6,518,349 B1 | 2/2003 | Felix et al. | |
| 2005/0171220 A1 | 8/2005 | Curtin et al. | |

FOREIGN PATENT DOCUMENTS

GB    1210794    10/1970

* cited by examiner

*Primary Examiner* — Michael M Bernshteyn

(57) ABSTRACT

A process for producing a dispersion of a highly fluorinated ion exchange polymer is provided in which a dispersion of a highly fluorinated ion exchange polymer in a first liquid that includes at least 10 wt % of an organic liquid is atomized and released into a heated gas to produce flowable particles of highly fluorinated ion exchange polymer having dry surface/exteriors and an internal residual moisture content of at least 4 wt %. The particles are dispersed in a second liquid to produce a second dispersion of highly fluorinated ion exchange polymer from which proton exchange membranes and electrodes for fuel cells may be produced.

23 Claims, 2 Drawing Sheets

PROCESS FOR PRODUCING DISPERSIONS OF HIGHLY FLUORINATED POLYMERS

FIELD OF THE INVENTION

The present invention relates to a process for producing dispersions highly fluorinated ion exchange polymer, and a process for producing materials such as membranes or electrodes from such dispersions.

BACKGROUND

Perfluorinated ion exchange polymers are used in making ion exchange membranes and other structures such as electrodes for fuel cell membrane electrode assemblies (MEAs). A well known perfluorinated ion exchange polymer is perfluorosulfonic acid ("PFSA") polymer, which is typically a copolymer of fluorinated ethylene units and sulfonyl-containing comonomer units. One such polymer, disclosed in U.S. Pat. No. 3,282,875, can be made by copolymerization of tetrafluoroethylene (TFE) and the perfluorinated vinyl ether perfluoro(3,6-dioxa-4-methyl-7-octenesulfonyl fluoride) (PDMOF) [$CF_2=CF-O-CF_2CF(CF_3)-O-CF_2CF_2SO_2F$], followed by hydrolysis and acid exchange. Another exemplary ion exchange polymer of the type disclosed in U.S. Pat. Nos. 4,358,545 and 4,940,525 has a side chain —O—$CF_2CF_2SO_3H$. The polymer can be made by copolymerization of tetrafluoroethylene (TFE) and the perfluorinated vinyl ether perfluoro(3-oxa-4-pentenesulfonyl fluoride) (POPF) [$CF_2=CF-O-CF_2CF_2SO_2F$] followed by hydrolysis and acid exchange.

Liquid compositions of perfluorinated ion exchange polymers are known for use in the manufacture of ion exchange membranes, for use in membrane coatings containing conductive or nonconductive particles, and for many other uses. While such liquid compositions are sometimes referred to as solutions, the compositions are generally recognized as being dispersions of polymer particles. U.S. Pat. No. 4,433,082 discloses a process for preparing liquid compositions containing perfluorinated ion exchange polymers having sulfonic acid groups or a salt thereof. The preferred liquid compositions contain 20 to 90% by weight of water and 10 to 80% by weight of an organic compound such as a lower alcohol. Such liquid compositions are sold commercially under the trademark Nafion® by E. I. du Pont de Nemours and Company, and typically contain up to 10% by weight of a perfluorinated ion exchange polymer having sulfonic acid groups in a medium of approximately 30-60% by weight water, 15-30% by weight 1-propanol, 15-30% by weight 2-propanol, and less than 10% by weight (total) of miscellaneous components consisting of methanol, mixed ethers and other volatile organic compounds.

PFSA dispersions for different end uses are currently produced by distillation of a raw dispersion of PFSA polymer in a mixture of water and solvents such as ethanol or 1-propanol among others. The raw dispersion is formed in acid ($SO_3H$) form from pellets of perfluorinated PFSA precursor resin in sulfonyl fluoride form through three process steps, namely, (1) a hydrolysis step, followed by (2) an acid exchange step, which is followed by (3) a dissolution step where the pellets are dissolved in the presence of solvents and water. The raw dispersions typically have a solids content of 18 to 23 wt %. The raw dispersion is then subjected to an ion exchange step to remove any metal ions in the dispersion. This ion exchanged raw dispersion must be further processed through extractive distillation and further dilution steps to adjust its composition to meet desired end product specifications such as % solids, % water, % 1-propanol, % ethanol, and viscosity among others. The distillation and dilution steps of this process have been difficult to control making such PFSA end product dispersions expensive to produce and difficult to reproduce.

U.S. Pat. No. 6,518,349 discloses spray drying of a dispersion of fluoropolymer in water or an organic solvent to produce a sprayable powder of friable particles of a non-fibrillatable fluoropolymer. The dispersion is spray dried with air or nitrogen at an inlet temperature of at least 290° C., but less than the melting temperature of the polymer, so as to produce a powder of water (or solvent) free granules that can be applied by electrostatic spraying techniques to the surface of articles such as cookware. Re-dispersion of the fluoropolymer powder is not disclosed.

US 2005/0171220 discloses spray drying an aqueous dispersion of a highly fluorinated polymer to obtain polymer particles that are re-dispersible in water. However, producing and containing the aqueous dispersion requires high temperatures and pressures as well as a special corrosion resistant reactor vessel made of an acid resistant alloy such as Hastelloy® or lined with an inert material such as glass or gold. The re-dispersions of the polymer particles may be treated with $H_2O_2$ to improve the color and remove undesirable odor.

SUMMARY

Accordingly there is provided a process for producing a dispersion of a highly fluorinated ion exchange polymer, comprising:

providing a dispersion of a highly fluorinated ion exchange polymer in a first liquid that includes at least 10 wt % of an organic liquid, atomizing said dispersion to produce droplets of the dispersion, releasing the dispersion droplets into a heated gas, drying the dispersion droplets in the heated gas to produce flowable particles of highly fluorinated ion exchange polymer, said polymer particles having dry surface/exteriors and an internal residual moisture content of at least 4 wt %, and dispersing said polymer particles in a second liquid selected from water, organic liquid, and mixtures thereof to produce a second dispersion of highly fluorinated ion exchange polymer.

In an embodiment, the inert gas is from the group consisting of nitrogen, argon, helium, neon, xenon and mixtures thereof.

In an embodiment, the second liquid comprises an organic liquid. In another embodiment the second liquid is a polar solvent. In yet another embodiment the second liquid comprises a mixture of alcohol and water. In another embodiment the second liquid comprises a mixture of alcohol and water and the alcohol is selected from the group consisting of methanol, ethanol, propanol, isopropanol, water and mixtures thereof.

In one embodiment, the polymer content of the second dispersion is in the range of 3 to 30 wt % polymer based on the total weight of the dispersion.

In another embodiment, the flowable polymer particles have an internal residual moisture content in the range of 4 to 10 wt %.

In another embodiment, the dispersion of highly fluorinated ion exchange polymer in a liquid further comprises an additive, which may be a catalyst.

In another embodiment, a proton exchange membrane is formed from the second dispersion. In another embodiment, the proton exchange membrane is a reinforced membrane. In yet another embodiment, a membrane electrode assembly comprises the proton exchange membrane formed from the second dispersion.

In another embodiment, an electrode comprising an ionomer binder is formed from the second dispersion and a catalyst. In yet another embodiment, a membrane electrode assembly comprises this electrode.

Another aspect of the present invention is towards a process for producing a proton exchange membrane comprised of highly fluorinated ion exchange polymer, comprising:

providing a dispersion of a highly fluorinated ion exchange polymer in a first liquid containing at least 10 wt % of an organic liquid, atomizing said dispersion to produce droplets of the dispersion, releasing the dispersion droplets into a heated inert gas, drying the dispersion droplets to produce flowable particles of highly fluorinated ion exchange polymer, said polymer particles having dry surface/exteriors and an internal residual moisture content of at least 4 wt %, dispersing said polymer particles in a second liquid to produce a second dispersion of highly fluorinated ion exchange polymer, forming said dispersion into a substrate, drying the substrate to remove the second liquid from the substrate to provide a proton exchange membrane comprised of the highly fluorinated ion exchange polymer.

An embodiment of the above process involves dispersing polymer particles in a second liquid where the second liquid is at a pressure of less than 2 atm and at a temperature in the range of 10 to 40° C. In an another embodiment, the second liquid is comprised of a mixture of alcohol and water. In yet another embodiment, the second liquid is from the group consisting of methanol, ethanol, propanol, isopropanol, water and mixtures thereof.

In another embodiment of the above process, the polymer content of the second dispersion is in the range of 1 to 40 wt % polymer based on the total weight of the dispersion. In another embodiment, flowable polymer particles have a mean particle size in the range of 1 to 100 microns. The flowable polymer particles may have an internal residual moisture content in the range of 4 to 10 wt %. In one embodiment, the highly fluorinated ion exchange polymer may be a perfluorinated polymer such as perfluorsulfonic acid.

In yet another embodiment of the process the dispersion of a highly fluorinated ion exchange polymer in a liquid containing at least 10 wt % of an organic liquid further comprises an additive, and the additive is homogeneously distributed throughout the proton exchange membrane.

A process for producing an electrode for a membrane electrode assembly is also disclosed. The process includes the steps of providing a dispersion of a highly fluorinated ion exchange polymer in a first liquid containing at least 10 wt % of an organic liquid, atomizing the dispersion to produce droplets of the dispersion, releasing the dispersion droplets into a heated inert gas, drying the dispersion droplets to produce flowable particles of highly fluorinated ion exchange polymer, the polymer particles having dry surface/exteriors and an internal residual moisture content of at least 4 wt %, dispersing said polymer particles in a second liquid to produce a second dispersion of highly fluorinated ion exchange polymer, mixing said second dispersion with catalyst particles and a solvent to from an electrode ink, forming the electrode ink into a substrate, and drying the substrate to remove the second liquid from the substrate to provide an electrode having as a binder of highly fluorinated ion exchange polymer.

In one embodiment, the second liquid is comprised of a mixture of alcohol and water. In an embodiment, the second liquid is comprised of a polar solvent. In yet another embodiment, the second liquid is from the group consisting of methanol, ethanol, propanol, isopropanol, and mixtures thereof. In an embodiment, the first liquid is selected from the group consisting of water, methanol, ethanol, propanol, isopropanol, and mixtures thereof. In an embodiment, the highly fluorinated ion exchange polymer is a perfluorinated polymer such as perfluorosulfonic acid.

In an embodiment, the dispersion of a highly fluorinated ion exchange polymer in a liquid containing at least 10 wt % of an organic liquid further comprises an additive, and the additive is homogeneously distributed throughout the electrode. In an embodiment, the additive is selected from the group consisting of catalysts, hydrophobic or hydrophilic particles, carbon black, electrically conductive polymers, pigments, talc, aramid polymers and fluoropolymers.

Another aspect is directed to a membrane electrode assembly comprising an electrode formed by the above process. Another aspect is a fuel cell comprising membrane electrode assemblies formed from such membrane electrode assemblies.

DETAILED DESCRIPTION

Figure 1:
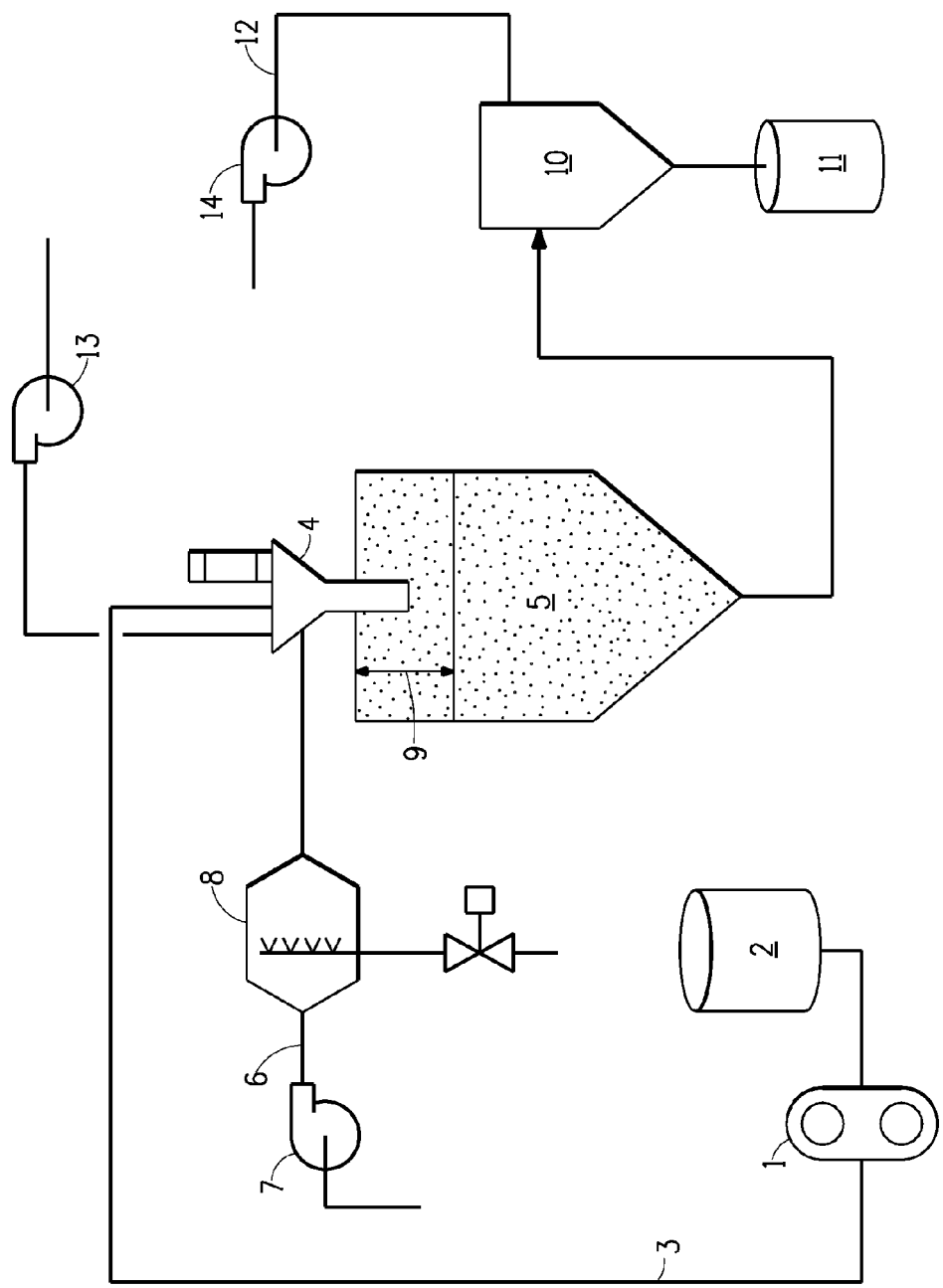
FIG. 1 is a schematic of an open loop spray drying system useful for producing highly fluorinated polymer powders from raw liquid dispersions.

The present invention provides a process for producing flowable and liquid dispersable particles of a highly fluorinated ion exchange polymer, by providing a dispersion of a highly fluorinated ion exchange polymer in a liquid comprised of at least 10 wt % of an organic liquid, atomizing the dispersion to produce droplets of the dispersion, releasing the dispersion droplets into a inert heated gas, and drying the dispersion droplets to produce flowable particles of highly fluorinated ion exchange polymer. The polymer particles have dry surface/exteriors and an internal residual moisture content of at least 4 wt %.

As used herein, the term "flowable" or "flowability" means that the particle/powder's ability to flow evenly, by means of gravity or other forces. "Flowability" is the result of the combination of material physical properties (such as particle size, shape, surface moisture content) that affect material flow, and the equipment used (such as hopper width, orifice) for handling, storing, or processing the material. As used herein, the term "dispersable" means that the particles can be dispersed in a liquid so as to generate a dispersion of the particles in the liquid.

Ion Exchange Polymer

Highly fluorinated ion exchange polymers are used in the process of the invention. As used herein, "highly fluorinated" means that at least 90% of the total number of univalent atoms in the polymer are fluorine atoms. Most typically, the highly fluorinated ion exchange polymer is perfluorinated. It is typical for the ion exchange polymers used in fuel cell membranes and electrodes to have sulfonate ion exchange groups. The term "sulfonate ion exchange groups" as used herein means either sulfonic acid groups or salts of sulfonic acid groups, typically alkali metal or ammonium salts.

The preferred ion exchange polymer comprises a polymer backbone with recurring side chains attached to the backbone with the side chains carrying the ion exchange groups. Homopolymers or copolymers or blends thereof can be used. Copolymers are typically formed from one monomer that is a nonfunctional monomer and that provides atoms for the polymer backbone, and a second monomer that provides atoms for the polymer backbone and also contributes a side chain carrying a cation exchange group or its precursor, e.g., a sulfonyl halide group such a sulfonyl fluoride ($-SO_2F$), which can be subsequently hydrolyzed to a sulfonate ion exchange group.

For example, copolymers of a first fluorinated vinyl monomer together with a second fluorinated vinyl monomer having a sulfonyl fluoride group can be used. The sulfonic acid form of the polymer may be utilized to avoid post treatment acid exchange steps. Exemplary first fluorinated vinyl monomers include tetrafluoroethylene (TFE), hexafluoropropylene, vinyl fluoride, vinylidene fluoride, trifluoroethylene, chlorotrifluoroethylene, perfluoro (alkyl vinyl ether), and mixtures of two or more thereof. Exemplary second monomers include fluorinated vinyl ethers with sulfonate ion exchange groups or precursor groups that can provide the desired side chain in the polymer. The first monomer can also have a side chain that does not interfere with the ion exchange function of the sulfonate ion exchange group. Additional monomers can also be incorporated into the polymers if desired.

In a one embodiment, the highly fluorinated ion exchange polymer has a carbon backbone with a side chain represented by the formula —(O—$CF_2$CFRf)$_a$-(O—$CF_2$)$_c$—(CFR'f)$_b$$SO_3$M, where Rf and R'f are independently selected from F, Cl or a perfluorinated alkyl group having 1 to 10 carbon atoms, a=0, 1 or 2, b=0 to 6, and c=0-1, and M is hydrogen Li, Na, K or N($R_1$)($R_2$)($R_3$)($R_4$) and $R_1$, $R_2$, $R_3$, and $R_4$ are the same or different and are H, $CH_3$ or $C_2H_5$. Specific examples of suitable polymers include those disclosed in U.S. Pat. Nos. 3,282,875; 4,358,545; and 4,940,525. One exemplary polymer comprises a perfluorocarbon backbone and a side chain represented by the formula —O—$CF_2$CF($CF_3$)—O—$CF_2$$CF_2$$SO_3$H. Such polymers are disclosed in U.S. Pat. No. 3,282,875 and can be made by copolymerization of tetrafluoroethylene (TFE) and the perfluorinated vinyl ether $CF_2$=CF—O—$CF_2$CF($CF_3$)—O—$CF_2$$CF_2$$SO_2$F, perfluoro (3,6-dioxa-4-methyl-7-octenesulfonyl fluoride) (PDMOF), followed by conversion to sulfonate groups by hydrolysis of the sulfonyl fluoride groups and ion exchanging to convert to the acid form, also known as the proton form. Another ion exchange polymer of the type disclosed in U.S. Pat. Nos. 4,358,545 and 4,940,525 has a side chain —O—$CF_2$$CF_2$$SO_3$H. The polymer can be made by copolymerization of tetrafluoroethylene (TFE) and the perfluorinated vinyl ether $CF_2$=CF—O—$CF_2$$CF_2$$SO_2$F, perfluoro(3-oxa-4-pentenesulfonyl fluoride) (POPF), followed by hydrolysis and acid exchange. Suitable perfluorinated polymer ion exchange dispersions in sulfonic acid form are available under the trademark Nafion® from E.I. du Pont de Nemours and Company, Wilmington, Del.

The highly fluorinated ion exchange polymers used in the process of the invention preferably have an ion exchange ratio of less than about 33. As used herein "ion exchange ratio" or "IXR" refers to the number of carbon atoms in the polymer backbone in relation to the cation exchange groups. The IXR is in the range of about 3 to about 33, and more preferably about 8 to about 23. The cation exchange capacity may also be expressed in terms of equivalent weight (EW). As used herein, EW is defined to be the weight of the polymer in acid form required to neutralize one equivalent of NaOH. In the case of a sulfonate polymer where the polymer comprises a perfluorocarbon backbone and the side chain is —O—$CF_2$—CF($CF_3$)—O—$CF_2$—$CF_2$—$SO_3$H (or a salt thereof), the equivalent weight range which corresponds to an IXR of about 8 to about 23 is about 750 EW to about 1500 EW. IXR for this polymer can be related to equivalent weight using the following formula: 50 IXR+344=EW.

In the process of the invention the flowable and redispersable polymer powder is generated by drying a raw dispersion of the highly fluorinated ion exchange polymer as described above in a liquid comprised of at least 10 wt % of an organic liquid. Preferably, 5 to 40 wt % of the dispersion is comprised of the fluorinated ion exchange polymer and the remainder of the dispersion is comprised of liquid. More preferably, 10 to 25 wt % of the dispersion is comprised of the fluorinated ion exchange polymer with the remainder comprised of liquid. The liquid is preferably comprised of 10 to 60 wt % of one or more organic liquids, and is more preferably comprised of 20 to 55 wt % of an organic liquid.

Frequently, much of the liquid of the raw dispersion is water. The organic liquid may be an alcohol such as methanol, ethanol, propanol, isopropanol, and mixtures thereof. In another embodiment, the organic liquid is fluorinated. By "fluorinated" it is meant that at least 10% of the total number of hydrogen and halogen atoms in the solvent is fluorine. Examples of fluorinated organic liquids include, but are not limited to, fluorocarbons (a compound containing only carbon and fluorine atoms), fluorocarbon ethers (a fluorocarbon additionally containing an ether linkage), hydrofluorocarbons (a compound containing only carbon, hydrogen and fluorine atoms), hydrofluorocarbon ethers (a hydrofluorocarbon additionally containing an ether linkage), chlorofluorocarbons (a compound containing only carbon, chlorine and fluorine atoms), chlorofluorocarbon ethers (a chlorofluorocarbon additionally containing an ether linkage), 2H-perfluoro(5-methyl-3,6-dioxanonane), and Fluorinert® electronic liquids (3M, St. Paul, Minn.). Suitable organic liquids also include fluorochemical solvents from DuPont. A mixture of one or more organic liquids may also be used.

The dispersion of a highly fluorinated ion exchange polymer may further include an additive. After the dispersion is dried, it is preferred that the additive be present in substantially all of the polymer particles. In one embodiment of the invention, the additive is a catalyst. Typically, the catalyst additive is selected from the group of platinum, palladium, ruthenium, rhodium, osmium, iridium, gold, lanthanum, yttrium, gadolinium, silver, iron, cerium, titanium, vanadium, hafnium, tantalum, niobium, chromium, molybdenum, tungsten, rhenium, or combinations thereof. Typically, such catalyst may be provided on a support such as carbon particles. Catalyst (such as platinum) additive typically has a particle size measured by X-Ray Diffraction (XRD) in the range of 20 to 38 Angstrom.

In another embodiment of the invention, the dispersion of highly fluorinated ion exchange polymer may further include an additive comprising a metal oxide, a stabilizer and a catalyst different from the stabilizer. The metal oxide is typically from the group of alumina, titanium dioxide, zirconium oxide, germania, silica, ceria, and combinations thereof. The stabilizer is typically from the group of metal ions and metalloid ions, and combinations thereof. The catalyst different from the stabilizer is typically from the group of platinum, palladium, lanthanum, yttrium, gadolinium, silver, iron, ruthenium, cerium, titanium, vanadium, and combinations thereof.

Other additives that may be included in the dispersion of highly fluorinated ion exchange polymer include polyvinyl pyrrolidone, hydrophobic or hydrophilic particles, carbon black, electrically conductive polymers, pigments, talc, aramid polymers and fluoropolymers.

Generating Polymer Particles

According to the invention, a dispersion of a highly fluorinated ion exchange polymer in a liquid consisting of at least 10 wt % of an organic liquid, is atomized to produce droplets of the dispersion, and released into a heated inert gas. The conditions are controlled such that the released droplets dry so as to produce flowable particles of the highly fluorinated ion exchange polymer. These polymer particles have dry exterior surfaces, but they also have an internal residual moisture content of at least 4 wt %, based on the weight of the particles. Preferably, the polymer particles have an internal residual moisture content in the range of 4 to 10 wt %, and more preferably in the range of 4 to 8 wt %. Internal residual moisture of the polymer particles is measured using a Sartorius Electronics Moisture Analyzer, Model MA30, Sartorius Corporation, 131 Heartland Blvd, Edgewood, N.Y. In one preferred embodiment of the invention, the polymer particles agglomerate during drying, and the agglomerated particles have a mean diameter in the range of 1 to 100 microns. In another embodiment of the invention, the polymer particles have a mean diameter in the range of 10 to 50 microns. Mean particle diameter is measured using a Horiba Laser Scattering Particle Size Distribution Analyzer, Model LA-910, Horiba International Corporation, Irvine, Calif.

The dispersion of a highly fluorinated ion exchange polymer in a liquid has a total solids content of at least 5 weight %, preferably from 5-35 weight %, more preferably from 10-30 weight % and most preferably from 20-30 weight %. Spray drying is accomplished by breaking the liquid dispersion into a multiplicity of droplets and releasing the droplets into a heated inert gas to produce powder particles.

According to one preferred process for practicing the process of the invention, the heated inert gas is contained within a drying chamber at the time the dispersion droplets are released. A preferred drying chamber has a chamber inlet through which the heated inert gas is introduced into the drying chamber and a chamber outlet through with the heated inert gas is discharged from the drying chamber. It has been found that by carefully controlling the temperature of the heated inert gas entering the drying chamber, controlling the rate at which the dispersion is introduced into the drying chamber, and by the process conditions can be adjusted such that the atomized dispersion droplets are dried to provide particles having dry exteriors, but having internal residual moisture so as to give the particles an overall internal residual moisture of at least 4 wt %. Preferably, the internal residual moisture is in hydrate form.

It has been found that when the temperature of the heated inert gas at the chamber inlet being is in the range of 170 to 250° C., the feed rates of the heated gas and the dispersion into the drying chamber can be adjusted so as to obtain polymer particles that are dry on the outside, but retain sufficient internal residual moisture so as to have an overall particle internal residual moisture of at least 4 wt %. The temperature of the heated inert gas at the chamber inlet is even more preferably in the range of 170 to 210° C. It has been found that polymer particles having the desired exterior dryness and internal residual moisture are obtained with the above chamber inlet temperature range when the heated gas flow and the dispersion flow rates are adjusted such that the temperature of the heated inert gas at the chamber outlet is maintained in the range of 70 to 90° C. The temperature of the inert gas at the chamber outlet is a function of the gas inlet temperature, the gas flow rate, and the dispersion flow rate.

Referring to FIG. 1, there is schematically shown a system for practicing the process of the invention. Specifically, in this embodiment, a dispersion of highly fluorinated ion exchange polymer and, optionally, at least one other component, is pumped by a low shear feed pump 1 from feed tank 2 through pipe 3 to rotating centrifugal atomizer 4 (cooled by cooling fan 13) located at the top of the spray dryer chamber 5. A heated inert gas, such as nitrogen, is supplied to chamber 5 by transporting the inert gas through pipe 6 with the aid of supply fan 7 and heating the inert gas by a direct fired gas burner 8. The heated gas and dispersion enter the chamber 5 through the atomizer 4 so as to generate a hot nitrogen envelope 9 in a top fraction of chamber 5. Heated gas may also be provided directly to the upper portion of the chamber 5. The temperature of the heated gas introduced into the chamber is in the range of from 170 to 250° C. and the hot air envelope typically has an average temperature in this range.

The aqueous dispersion passes through centrifugal atomizer 4 into the hot air envelope 9 where the water is rapidly vaporized to generate primary polymer particles that quickly begin to agglomerate to form larger particles. As the particles descend downwardly through chamber 5, they grow and are exposed to decreasing temperatures. The polymer particles move with a gas stream of evaporating water and inert gas until powder particles exit the chamber with the gas where the temperature of the gas is typically in the range of from about 700 to 90° C. Powder particles are separated from the gas stream in baghouse 10 and collected in powder container 11. The gas stream of nitrogen and water vapor passes through baghouse 10, and is vented to the atmosphere through stack pipe 12, optionally with the aid of an exhaust fan 14.

Figure 2:
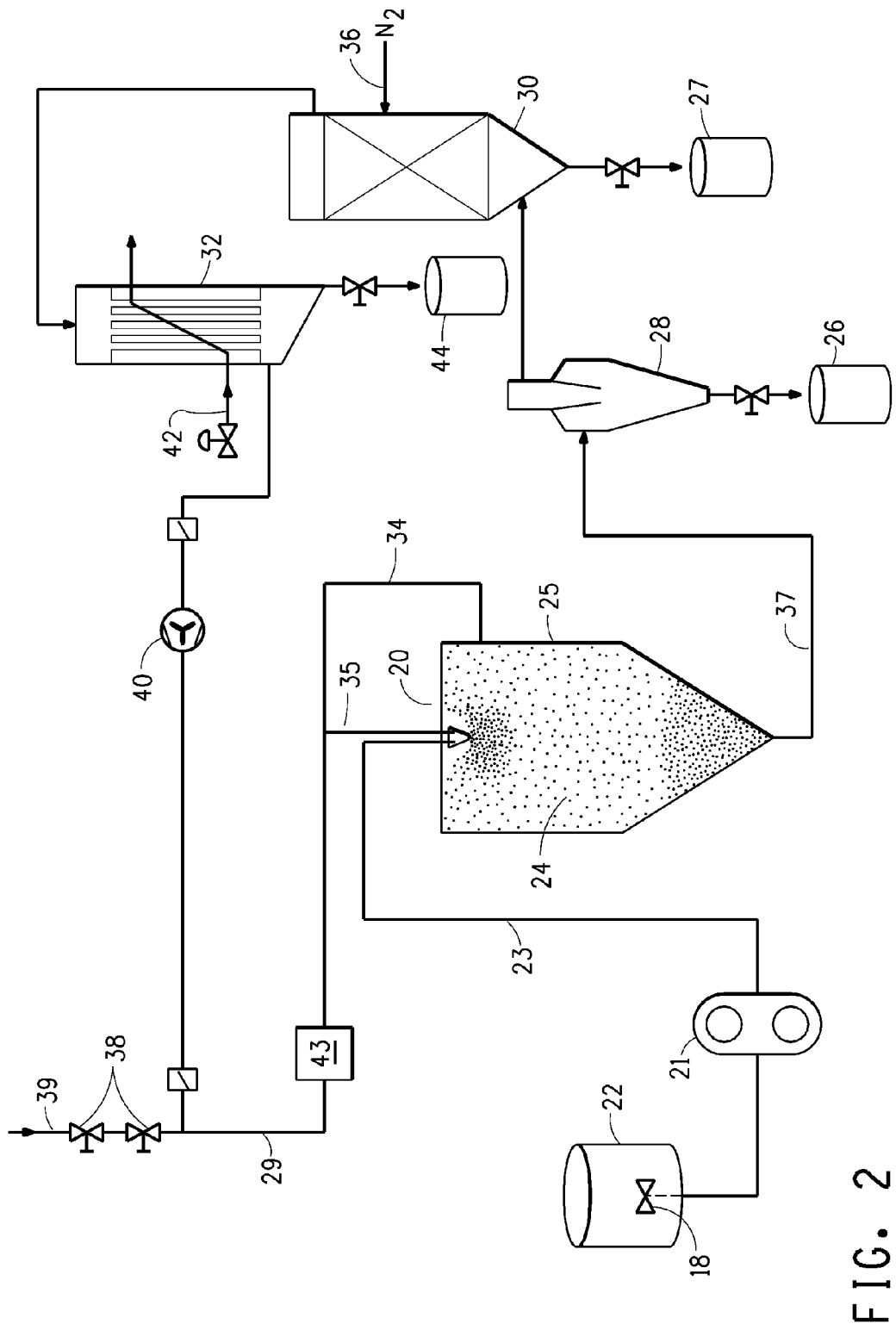
FIG. 2 is a schematic of a closed loop spray drying system useful for producing highly fluorinated polymer powders from raw liquid dispersions.

Referring to FIG. 2, there is schematically shown an alternative closed loop system for practicing the process of the invention. The liquid dispersion used in this system is as described above. Spray drying is accomplished by atomizing the polymer dispersion as the dispersion and a pressurized inert gas enter the drying chamber through a two-fluid nozzle that breaks the dispersion into a multiplicity of very fine droplets that are subjected to the droplets to the heated inert gas to produce powder particles. Specifically, with the closed loop spray drying system shown in FIG. 2, a dispersion of highly fluorinated ion exchange polymer and, optionally, at least one other additive component, are held in a feed tank 22 having an agitator 18. The dispersion is pumped by a low shear feed pump 21 from feed tank 22 through pipe 23 to the two fluid nozzle 20. As the dispersion is discharged from the nozzle 20, the dispersion is impacted by heated inert gas that is supplied through the pipe 35 and is simultaneously discharged from the two fluid nozzle. The gas in the nozzle is at a pressure of about 1.5 bars. The pressurized inert gas atomizes the dispersion as the dispersion is discharged from the nozzle in a manner similar to that of a pressurized snow making gun. The fine droplets are discharged into the upper portion of a drying chamber 25. If desired, additional atomizers as are known in the art can be discharged into the chamber 25.

Heated inert gas, such as nitrogen, is supplied to chamber 25 by transporting the inert gas through the pipe 29 and a heater 43, such as a direct fired gas burner, and the supply pipe 34. The pressurized inert gas discharged from the two-fluid nozzle 20 does not necessarily have to be heated, but it may be heated by the dryer 43 and supplied through pipe 35 (as shown) to assist the drying process in the spray dryer. The heated inert gas in the chamber 25 serves as a drying gas creating a hot gas envelope in a upper portion of chamber 25. The temperature of the heated nitrogen introduced into the chamber is in the range of from 170 to 250° C. and the hot gas envelope in the upper portion of the chamber 25 has an average temperature in the same range. The dispersion discharged from the two fluid nozzles is injected into the hot nitrogen envelope where the liquid in the droplets is rapidly vaporized to produce primary polymer particles that quickly begin to agglomerate into larger particles. As the particles descend downwardly through chamber 25, they grow and are exposed to decreasing gas temperatures moving with a gas stream of evaporating liquid until powder particles chamber 25 with the gas stream. The temperature of the inert gas at the outlet of chamber 25 is typically in the range of from about 70° to 90° C.

In the system shown in FIG. 2, particles are separated from the gas stream in a cyclone separator 28 and collected in a particle collection container 26. Residual polymer particles remaining in the gas stream after the cyclone separator 28 are separated from the gas stream in a baghouse 30 and collected in particle container 27. The inert gas and liquid vapor are passed through a condenser 32 having coils cooled by a fluid 42 so as to recover the liquid vapor which is processed separately. The vapor free inert gas is recycled back to the pipe 29 and heater 43 with the assistance of a fan or pump 40. Additional make-up inert gas can be provided to the system through the baghouse gas inlet 36 or through other valves and inlets such as the valves 38 and inlet line 39.

Re-Dispersion of Polymer Particles

The flowable particles of the highly fluorinated ion exchange polymer, having a residual moisture content of at least 4 wt %, as described above, are re-dispersable in a second liquid so as to produce a second dispersion of highly fluorinated ion exchange polymer. In one preferred embodiment, during the step of dispersing the polymer particles in the second liquid, the second liquid is at a pressure of less than 2 atm and at a temperature in the range of 10 to 40° C. The second liquid may consists essentially of water. Alternatively, the second liquid may comprise an organic liquid such as a polar, small molecule organic liquid. Suitable organic liquids include lower (C 1-4) alcohols, acetic acid, dimethylformamide, dimethylacetamide, dimethyl sulfoxide, ethylene glycol, acetonitrile, tetramethylene cyclic sulfone, succinonitrile, or mixtures thereof. Preferred alcohols are from the group of methanol, ethanol, propanol, isopropanol, and mixtures thereof. In another embodiment, the second liquid comprises a mixture of an organic liquid and water.

A re-dispersion of the polymer particle powder and liquid can be formed at ambient temperatures and pressures. For example, a flowable powder of highly fluorinated ion exchange polymer, an alcohol solvent such as 1-propanol and water can be mixed at room temperature and pressure as follows. The ion exchange polymer powder is and 1-propanol are added to a beaker and stirred for 15-20 minutes until the highly fluorinated ion exchange polymer powder is fully wetted and begins to dissolve. Distilled water is then poured into the dispersion and stirred for another 30 minutes by which time the mixture becomes a clear, colorless and transparent dispersion.

The polymer content of the re-dispersion is typically in the range of 1 to 40 wt % polymer based on the total weight of the dispersion, and may be in the more typical range of 3 to 30 wt % polymer based on the total weight of the dispersion. This process provides a stable colloid dispersion in water and an organic liquid at room temperature. By "stable colloid" is meant that the dispersion has properties which do not change substantially over period of 30 days when stored without agitation at room temperature. The polymer content, solvent, and the proportions of solvent and water can be easily selected in accordance with the desired end use for the dispersion. For example, dispersions having 25 to 30 percent solids have been found to be useful for producing cast membranes, while lower solids contents may be desirable for making reinforced membranes, and still lower solids concentrations may be desired for dispersions to be used for making electrode inks.

Proton Exchange Membranes

Proton exchange membranes can be made from the highly fluorinated ion exchange polymer re-dispersions described above using known extrusion or casting techniques. These membranes have thicknesses that can vary depending upon the intended application, typically ranging from 10 mils to less than 1 mil. The preferred membranes used in fuel cell applications have a thickness of about 5 mils (about 127 microns) or less, and preferably about 2 mils (about 50.8 microns) or less.

Reinforced perfluorinated ion exchange polymer membranes can also be made from the highly fluorinated ion exchange polymer re-dispersions described above using known casting techniques. Reinforced membranes can be made by impregnating a porous substrate with a re-dispersion of ion exchange polymer in an organic liquid and water. The porous substrate may improve mechanical properties for some applications and/or decrease costs. The porous substrate can be made from a wide range of components, including, for example, hydrocarbons, polyolefins such polyethylene, polypropylene, polybutylene, and copolymers including polyolefins. Perhalogenated polymers such as polytetrafluoroethylene (PTFE) or polychlorotrifluoroethylene can also be used. Impregnation of expanded PTFE (ePTFE) with perfluorinated sulfonic acid polymer is disclosed in U.S. Pat. Nos. 5,547,551 and 6,110,333. ePTFE is available under the trade name "Goretex" from W. L. Gore and Associates, Inc., Elkton, Md., and under the trade name "Tetratex" from Tetratec, Feasterville, Pa. Alternatively, the porous substrate may be comprised of perfluoroalkoxy (PFA), fluorinated ethylene propylene (FEP), polyvinylidene fluoride (PVDF), ethylene/tetrafluoroethylene copolymer (ETFE), and ethylene/chlorotrifluorethylene copolymer (ECTFE), and combinations thereof. In another instance, the porous substrate may comprise aramid fibers of Kevlar® fibrils or Nomex® fibrils from DuPont.

Electrodes

For the electrodes to function effectively in fuel cells, effective anode and cathode electrocatalyst sites must be provided in the anode and cathode electrodes. In order for the anode and cathode to be effective: (1) the electrocatalyst sites must be accessible to the reactant, (2) the electrocatalyst sites must be electrically connected to the gas diffusion layer, and (3) the electrocatalyst sites must be ionically connected to the fuel cell electrolyte. The electrocatalyst sites are ionically connected to the electrolyte via the ion exchange polymer binder of the electrode. The ion exchange polymer used in making an electrode may be the re-dispersion of a highly fluorinated ionomer described above. Because the binder employed in the electrode serves not only as binder for the electrocatalyst particles, but may also assist in securing the electrode to the membrane, it is preferred that the ion exchange polymers in the binder composition be compatible with the ion exchange polymer in the membrane. Most typically, ion exchange polymers in the binder composition are the same as the ion exchange polymer in the membrane.

In the anode electrode, it is preferable to adjust the amounts of anode electrocatalyst, ion exchange polymer and other components, if present, so that the anode electrocatalyst is a major component by weight of the resulting electrode. More preferably, the weight ratio of anode electrocatalyst to ion exchange polymer binder in the anode electrode is about 1:1 to about 10:1, and more preferably 2:1 to 5:1.

In the cathode electrode, it is preferable to adjust the amounts of cathode electrocatalyst, ion exchange polymer and other components, if present, so that the cathode electrocatalyst is a major component by weight of the resulting electrode. More preferably, the weight ratio of cathode electrocatalyst to ion exchange polymer binder in the cathode electrode is about 1:1 to about 10:1, and more preferably 2:1 to 5:1.

In order to form the anode or cathode electrodes, the anode electrocatalyst or the cathode electrocatalyst is slurried with the re-dispersion of a highly fluorinated ion exchange polymer, preferably in water, alcohol, or a water/alcohol mixture to form a catalyst dispersion. Any additional additives such as are commonly employed in the art may also be incorporated into the slurry.

An electrocatalyst ink or paste for use in making the anode or cathode electrodes is made by combining the electrocatalyst, the highly fluorinated ion exchange polymer re-dispersion, and a suitable liquid medium. It is advantageous for the medium to have a sufficiently low boiling point that rapid drying of electrode layers is possible under the process conditions employed, provided however, that the composition does not dry so fast that the composition dries before transfer to the membrane in cases where it is desired for the electrode to be wet at the time of transfer. The liquid medium is typically polar for compatibility with the ion exchange polymer, and is preferably able to wet the proton exchange membrane.

While it is possible for water to be used as the liquid medium, the medium is preferably such that the ion exchange polymer coalesces upon drying and does not require post treatment steps such as heating to form a stable electrode layer. Where the liquid medium is water, it may be used in combination with surfactant, alcohols or other miscible solvents.

A wide variety of polar organic liquids and mixtures thereof can serve as suitable liquid media for the electrocatalyst coating ink or paste. Water can be present in the medium if it does not interfere with the coating process. Although some polar organic liquids can swell the membrane when present in sufficiently large quantity, the amount of liquid used in the electrocatalyst coating is preferably small enough that the adverse effects from swelling during the process are minor or undetectable. A variety of alcohols are well suited for use as the liquid medium including $C_4$ to $C_8$ alkyl alcohols such as n-, iso-, sec- and tert-butyl alcohols. Preferred alcohols are n-butanol and n-hexanol, and n-hexanol is more preferred. Other preferred liquid media are fluorinated solvents such as the primarily 12 carbon perfluoro compounds of FC-40 and FC-70 Fluorinert™ brand electronic liquids from 3M Company. The amount of liquid medium used in the electrocatalyst coating ink or paste varies and is determined by the type of medium employed, the constituents of the electrocatalyst coating, the type of coating equipment employed, desired electrode thickness, process speeds etc.

The size of the particles in the electrocatalyst ink is reduced by grinding, milling or sonication to obtain a particle size those results in the best utilization of the electrocatalyst. The particle size, as measured by a Hegman gauge, is preferably reduced to less than 10 microns and more preferably to less than 5 microns.

The resulting electrocatalyst paste or ink may then be coated onto an appropriate substrate for incorporation into an MEA. Known electrocatalyst coating techniques can be used and produce a wide variety of applied layers of essentially any thickness ranging from very thick, e.g., 30 µm or more, to very thin, e.g., 1 µm or less. Typical manufacturing techniques involve the application of the electrocatalyst ink or paste onto either the polymer exchange membrane or a gas diffusion substrate. Additionally, electrode decals can be fabricated and then transferred to the membrane or gas diffusion backing layers. Methods for applying the electrocatalyst onto the substrate include spraying, painting, patch coating and screen printing or flexographic printing. The thickness of the anode and cathode electrodes typically ranges from about 0.1 to about 30 microns.

In one method of preparation, an electrode is prepared as a decal by spreading the catalyst ink on a flat release substrate such as Kapton® polyimide film (available from the DuPont, Wilmington, Del.). The decal is transferred to the surface of the membrane by the application of pressure and optional heat, followed by removal of the release substrate to form a catalyst coated membrane ("CCM"). The membrane is preferably wet at the time that the electrode decal is transferred to the membrane. Alternatively, the electrocatalyst ink may be applied directly to the membrane, such as by printing, after which the catalyst film is dried at a temperature not greater than 200° C. The CCM, thus formed, is then combined with a gas diffusion backing substrate to form an MEA.

Another method is to first combine the catalyst ink of the invention with a gas diffusion backing substrate, and then, in a subsequent thermal consolidation step, with the proton exchange membrane. This consolidation may be performed simultaneously with consolidation of the MEA at a temperature no greater than 200° C., preferably in the range of 140-160° C. The gas diffusion backing comprises a porous, conductive sheet material such as paper or cloth, made from a woven or non-woven carbon fiber, that can optionally be treated to exhibit hydrophilic or hydrophobic behavior, and coated on one or both surfaces with a gas diffusion layer, typically comprising a film of particles and a binder, for example, fluoropolymers such as PTFE. Gas diffusion backings for use in accordance with the present invention as well as the methods for making the gas diffusion backings are those conventional gas diffusion backings and methods known to those skilled in the art.

It is contemplated that the membranes and electrodes described above can be used to produce membrane electrode assemblies of a fuel cell, wherein each assembly includes a proton exchange membrane, anode and cathode electrodes, and gas diffusion backings. Bipolar separator plates, made of a conductive material and providing flow fields for the reactants, are placed between adjacent MEAs. A number of MEAs and bipolar plates are assembled in this manner to provide a fuel cell stack.

EXAMPLES

The following examples provide specific embodiments of the present invention and further illustrate its innovative aspects. Parts and percentages are by weight unless otherwise indicated.

In the examples, abbreviations are used as follows:
PTFE represents polytetrafluoroethylene;
TFE/PDMOF represents a copolymer of tetrafluoroethylene and perfluoro (3,6-dioxa4-methyl-7-octenesulfonyl fluoride); and
EW represents the equivalent weight of the fluoropolymer.
Raw Polymer Dispersions For each dispersion, a mixture of TFE/PDMOF copolymer pellets (25%+/−2% wt), ethanol (15%+/−2% wt) and DI water (60%+/−2% wt) was charged into an agitated/baffled/hot oil jacketed pressure reactor vessel. The TFE/PDMOF copolymer had been chemically stabilized. By "chemically stabilized" it is meant that the copolymer was treated with a fluorinating agent to reduce the number of unstable groups in the copolymer, typically to less than about 200 unstable groups per $10^6$ carbon atoms in the copolymer. Chemically stabilized fluorinated polymers are described in GB 1,210,794. The —$SO_2F$ groups of the copolymer had been hydrolyzed and acid exchanged to the —$SO_3H$ form. The polymer pellets contained about 5% by weight of absorbed water. For Dispersion A, a TFE/PDMOF copolymer having an EW of 920 was used. For Dispersion B, a TFE/PDMOF copolymer having an EW of 1000 was used.

For each of the dispersions, the mixture was heated to about 230° C. through a hot oil jacket, while being stirred at an average agitator speed of about 158 rpm over 2 hours. During this time, reactor pressure was increased from atmospheric to <1000 psig. After the two hours, the polymer pellets had dissolved into very small particles and formed a dispersion within the liquid (ethanol & DI water). Next, the process temperature was adjusted to about 68° C. and 1-propanol (NPA) was added (21%+/−3% wt of the final batch weight), and the agitator speed was decreased to 68 rpm. After the NPA addition, the reactor was vented to reduce the concentration of ethanol and water. Venting lasted for about 1.5 hours with process temperature maintained at 60° C. The process was complete and terminated when raw dispersion final specifications were met, namely, 20%+/−2% wt polymer solids, 50%+/−5% wt water, 20%+/−5% wt 1-propanol, <10% wt ethanol and viscosity in the range of 50 to 500 centipoise. A small amount of 2-propanol forms during this process. A Dispersion C was prepared by blending Dispersions A and B at a ratio of 1:1 by weight.

Dispersions D and E were similar except that they each contained an additional additive. Dispersion D included 0.84% wt of about particles of a ceria/boron/silicon complex having an average diameter of about 15 nanometers and Dispersion E included 2% wt of polyvinyl pyrrolidone ("PVP").

| Dispersion | EW | % Polymer | % Water | % 1-Propanol | % 2-Propanol | % Ethanol | % Additive | Viscosity (cP) |
|---|---|---|---|---|---|---|---|---|
| A | 941 | 20.1 | 50.5 | 21.2 | 2.5 | 5.7 | — | 127 |
| B | 1018 | 20.0 | 48.3 | 22.9 | 2.8 | 6.0 | — | 342 |
| C | 1:1 by wt blend of A and B | 20.0 | 49.4 | 22.1 | 2.7 | 5.9 | — | 235 |
| D | 935 | 21.0 | 56.3 | 19.6 | 2.3 | 0 | 0.84 | 71 |
| E | 1007 | 18.0 | 47.4 | 23.8 | 2.4 | 6.4 | 2.0 | 960 |

Examples 1-9

Preparation of Polymer Powders

Polymer particle powders were prepared by feeding fluoropolymer Dispersions A, B, C, D and E above to a spray dryer as shown in FIG. 2. For Examples 1-9, the spray dryer used was a Niro Mobile Minor™ closed cycle spray dryer, available from Niro Inc., Columbia, Md. In each example, a liquid dispersion was injected into a spray dryer through a two-fluid nozzle. One fluid was pressurized nitrogen and the other was the dispersion. The pressurized nitrogen atomized the dispersion as the nitrogen and dispersion were discharged from the two-fluid nozzle. The nozzle was directed downward from the center upper portion of the spray dryer as shown in FIG. 2. The dispersion was discharged into the hot nitrogen in the spray dryer and the liquid in the dispersion was rapidly vaporized such that particles of polymer, and optionally of additive, agglomerated and dried during particle descent through the chamber.

Specific process conditions are listed in Table 1, including nitrogen temperature at the inlet to the chamber and at the outlet of the chamber, the pressure and flow rate of nitrogen supplied to the two-fluid nozzle, and the dispersion feed rate to the nozzle. Powder particles having bulk densities in the range of from 30-65 g/100 cc were separated from the gas stream of liquid vapor and nitrogen using a cyclone separator followed by a baghouse as shown in FIG. 2. The internal moisture content, mean particle size, bulk density and color of the spray dried powder prepared in Examples 1-9 are listed in Table 1. In Comparative Example 7, the internal residual moisture of the powder was less than 2%. In Examples 8 and 9, additives were incorporated into the powders.

TABLE 1

|  | Ex. 1 | Ex. 2 | Ex. 3 | Ex. 4 | Ex. 5 |
|---|---|---|---|---|---|
| Dispersion | A | A | A | B | B |
| Weight % Total Solids | 20.1% | 20.1% | 20.1% | 20.0% | 20.0% |
| Additive (wt % of total dispersion) | — | — | — | — | — |
| Process Conditions | | | | | |
| Nozzle Tip Dia, (mm) | 1.3 | 1.3 | 1.3 | 1.3 | 1.3 |
| Inlet N₂ Temp, (C.) | 170 | 190 | 230 | 230 | 210 |
| Outlet N₂ Temp, (C.) | 76 | 75 | 76 | 76 | 78 |
| Atomizing N₂ Press, (bar) | 1.5 | 1.5 | 1.5 | 1.5 | 1.5 |
| Atomizing N₂ Flow Rate (kg/hr) | 10.9 | 10.9 | 10.9 | 10.9 | 10.9 |
| Dispersion Feed Rate (kg/hr) | 0.35 | 0.64 | 0.80 | 0.77 | 0.90 |
| Powder Properties | | | | | |
| Residual Moisture (% Wt) | 4.42 | 5.33 | 5.39 | 5.90 | 5.70 |
| Mean Particle Size (microns) | 40.35 | 32.59 | 38.67 | 26.73 | 29.92 |
| Bulk Density (grams/100 cc) | 34.7 | 40.6 | 50.7 | 50.1 | 35.7 |
| Color | white | white | white | white | white |

|  | Ex. 6 | Comp. Ex. 7 | Ex. 8 | Ex. 9 |
|---|---|---|---|---|
| Dispersion | C (Blend) | A | D | E |
| Weight % Total Solids | 20.0% | 20.1% | 21.84% | 20.0% |
| Additive (wt % of total dispersion) | — | — | 0.84% Ce/B/SiO₂ | 2% PVP |
| Process Conditions | | | | |
| Nozzle Tip Dia, (mm) | 1.3 | 1.3 | 1.3 | 1.3 |
| Inlet N₂ Temp, (C.) | 250 | 250 | 190 | 190 |
| Outlet N₂ Temp, (C.) | 76 | 115 | 77 | 77 |
| Atomizing N₂ Press, (bar) | 1.5 | 1.5 | 1.5 | 1.5 |
| Atomizing N₂ Flow Rate (kg/hr) | 10.9 | 10.9 | 10.9 | 10.9 |
| Dispersion Feed Rate (kg/hr) | 1.18 | 0.58 | 0.83 | 0.90 |

TABLE 1-continued

| Powder Properties | | | | |
|---|---|---|---|---|
| Residual Moisture (% Wt) | 7.39 | 1.59 | 5.46 | 5.60 |
| Mean Particle Size (microns) | 33.88 | >300* | 27.25 | 23.76 |
| Bulk Density (grams/100 cc) | 47.0 | —** | 36.9 | 61.6 |
| Color | white | white | white | white |

*chunky;
**too high to measure

Examples 10-18

Re-Dispersion of Powder

For each of the following Examples 10-18, 1-propanol was placed into a stainless steel container with an air driven agitator at room temperature and atmospheric pressure while the agitator rotated at about 250 rpm. For each of the re-dispersion Examples 10, 12 and 14-18 below, a polymer powder from one of the Examples 1-9 was weighed and added to the 1-propanol. The Example from which the polymer powder was obtained and the weight of the powder is set for in Table 2 below. Depending on the Example, the weight ratio of 1-proponal to polymer was from 1:1 to 9:1. The contents were agitated for at least one hour and until the polymer powder was fully wetted and dispersed in the 1-propanol. About the same weight of DI water as 1-proponal was added to the container and the agitation was continued for about four additional hours until the dispersion was clear and colorless.

In Examples 11 and 13, where larger quantities of dispersion were generated, the ingredients were mixed more gradually. In Example 11, 227 grams of the polymer powder of Example 2 were added to 484 grams of 1-proponal and agitated for three hours. To the mixture, 484 grams of DI water were added and the mixture was agitated for another two hours. The agitator was then turned off for 14 hours before being restarted. When agitation was resumed, the viscosity was adjusted by adding 45 grams of 1-propanol and 35 grams of DI water to the mixture, agitating for an hour, then adding another 20 grams of 1-propanol and 20 grams of DI water and agitating for another two hours. In Example 13, 800 grams of DI water were added to 800 grams of 1-propanol before 280 grams of the polymer powder from Example 4 was added to the mixture which was agitated for an hour. Another 120 grams of the polymer powder from Example 4 was added and the mixture was agitated for another 4 hours.

For each of the re-dispersion Examples 10-18, the weight percent of polymer, 1-proponal and water, and the viscosity and appearance of the dispersion is listed in Table 2 below.

TABLE 2

| | Example | | | | |
|---|---|---|---|---|---|
| | Ex. 10 | Ex. 11 | Ex. 12 | Ex. 13 | Ex. 14 |
| Polymer Powder | | | | | |
| Weight Powder (gms) | 1.62 | 227.50 | 8.84 | 400.00 | 8.88 |
| From Example: | 1 | 2 | 3 | 4 | 5 |
| Raw Dispersion Used | A | A | A | B | B |
| Residual Moisture (% Wt) | 4.42 | 5.33 | 5.39 | 5.90 | 5.70 |
| Avg. particle size (μm) | 40.35 | 32.59 | 38.67 | 26.73 | 29.92 |
| Liquid | | | | | |
| Water (gms) | 14.16 | 543.75 | 10.58 | 800.00 | 10.56 |
| 1-Propanal (gms) | 14.22 | 543.75 | 10.58 | 800.00 | 10.56 |
| Re-dispersion | | | | | |
| Polymer (% Wt) | 5.40 | 17.30 | 29.50 | 20.00 | 29.60 |
| 1-Propanal (% Wt) | 47.40 | 41.35 | 35.25 | 40.00 | 35.20 |
| Water (% Wt) | 47.20 | 41.35 | 35.25 | 40.00 | 35.20 |
| Viscosity (cP) | 7 | 120 | 803 | 210 | 2087 |
| Appearance | clear colorless | clear colorless | clear colorless | clear colorless | clear colorless |

| | Example | | | |
|---|---|---|---|---|
| | Ex. 15 | Comp. Ex. 16 | Ex. 17 | Ex. 18 |
| Polymer Powder | | | | |
| Weight Powder (gms) | 9.06 | 6.00 | 6.00 | 6.00 |
| From Example: | 6 | Comp. Ex. 7 | 8 | 9 |
| Raw Dispersion Used | C | A | D | E |
| Residual Moisture (% Wt) | 7.39 | 1.59 | 5.46 | 5.60 |
| Avg. particle size (μm) | 33.88 | >300 | 27.25 | 23.74 |
| Liquid | | | | |
| Water (gms) | 10.12 | 12.00 | 12.00 | 12.00 |
| 1-Propanal (gms) | 10.82 | 12.00 | 12.00 | 12.00 |

TABLE 2-continued

Re-dispersion

| | | | | |
|---|---|---|---|---|
| Polymer (% Wt) | 30.21 | 20.0 | 19.99* | 19.99** |
| 1-Proponal (% Wt) | 36.05 | 40.0 | 39.99 | 40.01 |
| Water (% Wt) | 33.74 | 40.0 | 40.02 | 40.00 |
| Viscosity (cP) | 1843 | NA | 101 | 417 |
| Appearance | clear colorless | Yellow tint-chunks did not disperse | clear colorless | Clear colorless |

*includes 0.84% Ce/B/Silicon nanoparticle additive
**includes 2.00% PVP additive Examples 19

Cast Membrane

A solution cast perfluorosulfonic acid membrane was prepared from the re-dispersion of Example 13 according to the following procedure. The dispersion of Example 13 was pumped from a slot die onto a Mylar® film moving at a line speed of 5 feet/minute. The slot opening was 5 mils thick and 14 inches (35.6 cm) wide. The pump speed and line speed were adjusted so as to obtain a membrane thickness of about 1 mil. The Mylar® film took the membrane through a three zone gas fired dryer that dried the membrane from above and below. Each dryer zone was 10 feet long and the temperature in each zone was as follows:
Zone 1: 45° C.
Zone 2: 73° C.
Zone 3: 96° C.
The dried membrane was subsequently heat treated to coalesce the polymer by moving the PFSA membrane on the Mylar® film through a three zone gas fired dryer that heated the membrane from above and below. The residence time for the membrane was 45 seconds in each zone for a total heating time of 135 seconds (+/−2 seconds). Each dryer zone was 15 feet long and the temperature in each zone was as follows:
Zone 1: 38° C.
Zone 2: 82° C.
Zone 3: 160° C.

Examples 20

Reinforced Membrane

A reinforced perfluorosulfonic acid membrane was prepared from the re-dispersion of Example 11 according to the following procedure. The dispersion of Example 11 was pumped from a slot die onto a first side of an expanded polytetrafluoroethylene (ePTFE) substrate supported on a Mylar® film moving at a line speed of 5 feet/minute. The ePTFE substrate was Style 2101 ePTFE Porous Film manufactured by Yeu Ming Tai Chemical Industrial Co. Ltd ("YMT"), Taichung, Taiwan, and having a 30 micron thickness, 0.3 micron pore size, 85% porosity, and an air permeability greater than 1200 ml/min/in². The slot opening was 5 mils thick and 14 inches (35.6 cm) wide. The ePTFE substrate on Mylar® film took the membrane through a three zone gas fired dryer that dried the membrane from above and below. Each dryer zone was 10 feet long and the temperature in each zone was as follows:
Zone 1: 48° C.
Zone 2: 73° C.
Zone 3: 95° C.
After the first side was dried, the Mylar® film was removed and the membrane was turned over and the other side of the ePTFE was coated with the dispersion of Example 11 under the same conditions. The pump speed and line speed were adjusted so as to obtain a 1 mil thick reinforced membrane. The membrane was passed through the three zone gas fired dryer again at the same speed and with the same zone temperatures. This reinforced perfluorosulfonic acid membrane was subsequently heat treated to coalesce the polymer by moving the PFSA film through the three zone gas fired dryer that heated the membrane from above and below. The residence time for the membrane was 45 seconds in each zone for a total heating time of about 135 seconds. Each dryer zone was 15 feet long and the temperature in each zone was as follows:
Zone 1: 38° C.
Zone 2: 82° C.
Zone 3: 160° C.

Example 21

Catalyst Inks

A re-dispersion comprised of 3 grams of the spray dried powder of Example 1, 29 grams of isopropyl alcohol ("IPA"), 29 grams of 1-propanol ("NPA"), and 29 grams of DI water was mixed in a heavy duty plastic jar. The container was cooled in an ice bath to bring down the solution temperature to ~0° C. while stirring the solution at 350 rpm using a high speed mixer (BDC 2002 mixer made by Caframo) in a nitrogen atmosphere. After the solution temperature reached ~0° C., 10 grams of carbon supported platinum catalyst (66.2 wt % Pt, 33.8 wt % particulate carbon) with a BET surface area of 243.5 m²/g (TEC10E70TPM catalyst obtained from Tanaka Kikinzoku Kogyo KK, Kanagawa, Japan) was added slowly to the re-dispersion over a period of about 15 minutes while mixing continued. Stirring was continued for 10-15 minutes after the addition of all of the carbon supported Pt. This catalyst ink mixture had a viscosity of 216 centipoise and the following formulation: 29% IPA, 29% NPA, 29% DI water, 3% ionomer and 10% catalyst.

The catalyst ink mixture was "sonicated" using a Branson Sonifier 450 at 70% power to break-up the electrocatalyst particles for 3-5 minutes at a time or until the temperature reached about 70° C. When the temperature reached 70° C., the sonication was stopped and the mixture was cooled to room temperature in the ice bath before "sonication" was resumed. Sonication was stopped when the maximum particle size in the ink mixture was determined to be less than 5 microns. Particle size was measured using a Hegman gauge. This ink mixture was concentrated using a "rotovap" at about 70° C. until the solids content of the ink was about 13 wt %. The maximum particle size in the ink mixture was once again tested. If the maximum particle size was more than 5 microns, the ink mixture was sonicated again using the sonication process described above until the maximum particle size was below 5 microns. The solid content and the viscosity of the ink mixture were measured and they were 13 wt % and 3275 centipoise, respectively.

Example 22

Electrode Decals

A electrode decals were prepared by knife drawing down the catalyst ink of Example 21 on a 8 cm×11 cm piece of 2 mil thick perfluoroalkoxy ("PFA") film at room temperature, and cut into a dimension of 7.07 cm×7.07 cm (to give a total area of about 50 $cm^2$. The coating thickness was selected so as to obtain a desired catalyst loading for an anode decal and a cathode decal. The anode decal had a Pt metal loading of 0.325 mg/$cm^2$ and a dry coating thickness was about 0.1 mil (0.00254 mm). The cathode decal had a Pt metal loading of 0.550 mg/$cm^2$ and a dry coating thickness was about 0.2 mil (0.00508 mm). The catalyst loading was measured using an XFR instrument.

Examples 23-26

Catalyst Coated Membranes

In Examples 23 and 24, catalyst coated membranes (CCMs) were generated using the membranes of Examples 19 and 20, respectively, by flexographically printing one side of each membrane with an anode electrode ink mixture and printing the opposite side of each membrane with a cathode electrode ink mixture.

The ink mixtures used to print each of the anode and cathode electrodes of Examples 23 and 24 were made with Nafion® DE 2020 TFE/PDMOF copolymer ionomer (920 EW measured by FTIR and in the sulfonyl fluoride form), and the catalyst was platinum supported on high surface area carbon (66.2 wt % Pt, 33.8 wt % particulate carbon with a BET surface area of 243.5 $m^2$/g (TEC10E70TPM catalyst obtained from Tanaka Kikinzoku Kogyo KK, Kanagawa, Japan). The solvent used in making the anode and cathode electrode ink mixtures for Example 23 and the anode electrode ink for Example 24 was 50 wt % DI water and 50 wt % dipropylene glycol monomethyl ether ("DPM"). The solvent used in making the cathode electrode ink for Example 24 was 100 wt % hexanol.

The ionomer and solvent were mixed in a heavy duty plastic jar. The container was cooled in an ice bath to bring down the solution temperature to ~0° C. while stirring the solution at 350 rpm using a high speed mixer (BDC 2002 mixer made by Caframo) in a nitrogen atmosphere. After the solution temperature reached ~0° C., 10.1 grams of the carbon supported platinum catalyst was added slowly to the dispersion over a period of about 15 minutes while mixing continued. Stirring was continued for 10-15 minutes after the addition of all of the carbon supported Pt. This catalyst ink mixture had a viscosity of 216 centipoise. The catalyst ink mixture was "sonicated" using a Branson Sonifier 450 at 70% power to break-up the electrocatalyst particles for 3-5 minutes at a time or until the temperature reached about 70° C. When the temperature reached 70° C., the sonication was stopped and the mixture was cooled to room temperature in the ice bath before "sonication" was resumed. Sonication was stopped when the maximum particle size in the ink mixture was determined to be less than 5 microns. Particle size was measured using a Hegman gauge. This ink mixture was concentrated using a "rotovap" at about 70° C. until the solids content of the ink was about 12 wt %. The maximum particle size in the ink mixture was once again tested. If the maximum particle size was more than 5 microns, the ink mixture was sonicated again using the sonication process described above until the maximum particle size was below 5 microns. The solid content and the viscosity of the ink mixture were measured and they were 12 wt % and 3275 centipoise, respectively.

In Examples 23 and 24, flexography ("flexo") was used to print the ink mixture directly onto a membrane. The flexo printing process uses a series of four rollers, namely, an ink roller, a meter (Anilox) roller, a plate (printing) cylinder and an impression cylinder. The ink roller transfers the electrode ink from an ink pan to the meter roller. The meter roller meters the ink to a uniform thickness onto the plate cylinder.

The membrane to be printed is supported on a Mylar substrate which is in turn taped on a belt that passes between the plate cylinder and the impression cylinder. The impression cylinder applies pressure to the plate cylinder, thereby transferring the image onto the membrane. The printed membrane is fed into a drying chamber with a heated environment of 90-100° F. The chamber is a flexi-glass enclosure, consisting of a continuous circular motor driven belt (16' in circumference×60" wide) and three support structures (equally spaced across the width of the belt) to hold a portable X-Ray Fluorescence (XRF) spectroscopy instrument. The XRF is used to measure the catalyst loading of a printed electrode before it completely dries.

Target average catalyst loadings for anode and cathode electrode are 0.30 and 0.53 mg Pt/$cm^2$, respectively. During flexo printing, after every two print passes or revolutions, catalyst loading is measured by XRF. The flexo printing process is repeated until catalyst loading is close to the target. Normally, the anode electrode is printed on the membrane first. The anode printed membrane on the Mylar substrate is removed off the belt. A second Mylar substrate is placed against the anode side of the membrane and the first Mylar substrate is peeled away from the opposite side of the membrane. The opposite side of the membrane is then flexo printed using the same flexo printing process. The ink compositions and the catalyst loading of the printed electrodes of Examples 23 and 24 are set forth in Table 3:

TABLE 3

|  | Ex. 23<br>Cast membrane | Ex. 24<br>Reinforced membrane |
|---|---|---|
| Anode Electrode |  |  |
| Catalyst to Nafion Ratio | 3.5:1 | 3.5:1 |
| Solvent | 50% DPM/50% Water | 50% DPM/50% Water |
| Catalyst Loading | 0.294 mg/$cm^2$ | 0.312 mg/$cm^2$ |
| Cathode Electrode |  |  |
| Catalyst to Nafion Ratio | 3.5:1 | 3.5:1 |
| Solvent | 50% DPM/50% Water | 100% Hexanol |
| Catalyst Loading | 0.542 mg/$cm^2$ | 0.551 mg/$cm^2$ |

In Examples 25, a CCM (Catalyst Coated Membrane) was generated by applying anode and cathode electrode decals made according to Example 22 to a conventional 1 mil thick cast Nafion® NRE 211 membrane in the sulfonic acid form sold by E. I. du Pont de Nemours and Company. A piece of dry membrane was sandwiched between one of the anode electrode decals of Example 22 on one side of the membrane and one of the cathode electrode decals of Example 22 on the opposite side of the membrane. Care was taken to ensure that the two decals were registered with each other and were positioned facing the membrane. The entire assembly was introduced between two preheated (to about 125° C.) 8 inch×8 inch plates of a hydraulic press and the plates of the press were brought together quickly until a pressure of 10000 lbs was reached. The sandwich assembly was kept under pressure for approximately 5 minutes and then the press was cooled for approximately 2 minutes until it reached a temperature below about 60° C. under the same pressure. The assembly was removed from the press and the PFA carrier films were slowly peeled off the electrodes on both sides of the membrane showing that the anode and cathode electrodes had been transferred to the membrane (now called a CCM).

In Example 26, the process of Example 25 was repeated to produce another catalyst coated membrane, except that the membrane used was the cast membrane of Example 19, which was made from the re-dispersion of Example 13.

The performance of the CCMs of examples 23-26 was measured employing a single cell test assembly obtained from Fuel Cell Technologies Inc, N. Mex. Membrane electrode assemblies were made that comprised one of the above CCMs sandwiched between two sheets of the gas diffusion backing (taking care to ensure that the GDB covered the electrode areas on the CCM). The anode and cathode gas diffusion backings were comprised of a 9.3 mil thick non-woven carbon fabric (25BC GDL, from SGL Carbon Group of Germany). Two 7 mil thick glass fiber reinforced silicone rubber gaskets (Furan—Type 1007, obtained from Stockwell Rubber Company) each along with a 1 mil thick FEP polymer spacer were cut to shape and positioned so as to surround the electrodes and GDBs on the opposite sides of the membrane and to cover the exposed edge areas of each side of the membrane. Care was taken to avoid overlapping of the GDB and the gasket material. The entire sandwich assembly was assembled between the anode and cathode flow field graphite plates of a 50 cm$^2$ standard single cell assembly (obtained from Fuel Cell Technologies Inc., Los Alamos, N. Mex.). The test assembly was also equipped with anode inlet, anode outlet, cathode gas inlet, cathode gas outlet, aluminum end blocks, tied together with tie rods, electrically insulating layer and the gold plated current collectors. The bolts on the outer plates of the single cell assembly were tightened with a torque wrench to a force of 2 ft.lbs.

The single cell assembly was then connected to the fuel cell test station. The components in a test station include a supply of air for use as cathode gas; a load box to regulate the power output from the fuel cell; a supply of hydrogen for use as the anode gas; a pump to feed the hydrogen to the fuel cell anode at the desired flow rate; and a collection bottle to collect unused hydrogen. With the cell at room temperature, hydrogen and air were introduced into the anode and cathode compartments through inlets of the cell at flow rates of 693 cc/min and 1650 cc/min, respectively. The temperature of the single cell was slowly raised until it reached 70° C. The theoretical value for both air and H2 stoich is 1. This corresponds to 100% utilization of air and hydrogen. The relationship between stoich and utilization is: % utilization=1/stoich×100. Thus, in the high pressure test and low pressure test protocols, which run at 2 stoich, the air and hydrogen % utilization is 50%. The cell back pressure is controlled by restricting the exit flow in the cell, which increases the overall system pressure. It is called back pressure because it is controlled at the cell outlet. The hydrogen and air feed rates were maintained proportional to the current while the resistance in the circuit was varied in steps so as to increase current. The cell voltage at a current density of 1 amps/cm$^2$ was measured and recorded in Table 4 below.

TABLE 4

|  | Example | | | |
| --- | --- | --- | --- | --- |
|  | 23 | 24 | 25 | 26 |
| Process | flexo printing | flexo printing | decal transfer | decal transfer |
| Membrane used | cast membrane of Ex. 19 | reinforced membrane of Ex. 20 | commercial membrane | cast membrane of Ex. 19 |
| High Pressure Test |  |  |  |  |
| Cell Temperature (° C.) | 60 | 60 | 60 | 60 |
| Air Stoich | 2 | 2 | 2 | 2 |
| Hydrogen Stoich | 2 | 2 | 2 | 2 |
| Cell Back Pressure (KPa) | 170 | 170 | 170 | 170 |
| Relative Humidity - Anode (%) | 100 | 100 | 100 | 100 |
| Relative Humidity - Cathode (%) | 100 | 100 | 100 | 100 |
| Voltage (mV@1 A/cm2) | 651 | 692 | 721 | 727 |
| Low Pressure Test |  |  |  |  |
| Cell Temperature (° C.) | 80 | 80 | 80 | 80 |
| Air Stoich | 2 | 2 | 2 | 2 |
| Hydrogen Stoich | 2 | 2 | 2 | 2 |
| Cell Back Pressure (KPa) | 50 | 50 | 50 | 50 |
| Relative Humidity - Anode (%) | 100 | 100 | 100 | 100 |
| Relative Humidity - Cathode (%) | 50 | 50 | 50 | 50 |
| Voltage (mV@1 A/cm2) | 638 | 666 | 695 | 684 |

What is claimed is:

1. A process for producing a dispersion of a highly fluorinated ion exchange polymer, comprising:

providing a dispersion of a highly fluorinated ion exchange polymer in a first liquid comprised of from 10 to 60 wt % of one or more organic liquids, of an organic liquid, atomizing said dispersion to produce droplets of the dispersion, releasing the dispersion droplets into a heated gas, drying the dispersion droplets in the heated gas to produce polymer particles wherein the polymer particles agglomerate during drying, and the agglomerated particles have a mean diameter in the range of 1 to 100 microns and which agglomerated particles, upon drying, produce flowable particles of highly fluorinated ion exchange polymer, wherein the flowable polymer particles have dry surfaces and an internal residual moisture content in the range of from 4 to 10 wt %, and dispersing said polymer particles in a second liquid selected from the group consisting of water, organic liquid, and mixtures thereof to produce a second dispersion of highly fluorinated ion exchange polymer.

2. The process of claim 1 wherein the heated gas is an inert gas selected from the group consisting of nitrogen, argon, helium, neon, xenon and mixtures thereof.

3. The process of claim 1 wherein during the step of dispersing said polymer particles in a second liquid, the second liquid is at a pressure of less than 2 atm and at a temperature in the range of 10 to 40° C.

4. The process of claim 1 wherein the second liquid comprises a mixture of alcohol and water and the alcohol is selected from the group consisting of methanol, ethanol, propanol, isopropanol, water and mixtures thereof.

5. The process of claim 1 wherein the first liquid is selected from the group consisting of water, methanol, ethanol, propanol, isopropanol, and mixtures thereof.

6. The process of claim 1 wherein the polymer content of the second dispersion is in the range of 1 to 40 wt % polymer based on the total weight of the dispersion.

7. The process of claim 1 wherein the heated gas is contained within a drying chamber at the time the dispersion droplets are released, said drying chamber having a chamber inlet through which the heated inert gas is introduced into the drying chamber and a chamber outlet through with the heated inert gas is discharged from the drying chamber, the temperature of the heated inert gas at the chamber inlet being in the range of 170 to 250° C.

8. The process of claim 7 wherein the temperature of the heated inert gas at the chamber inlet is in the range of 170 to 210° C.

9. The process of claim 7 wherein the temperature of the heated inert gas at the chamber outlet is in the range of 70 to 90° C.

10. The process of claim 1 wherein the highly fluorinated ion exchange polymer is perfluorosulfonic acid.

11. The process of claim 1 wherein the dispersion of a highly fluorinated ion exchange polymer in a liquid further comprises one or more additive, and wherein said additive is present in substantially all of the polymer particles.

12. The process of claim wherein the additive comprises a catalyst selected from the group consisting of platinum, palladium, ruthenium, rhodium, osmium, iridium, gold, lanthanum, yttrium, gadolinium, silver, iron, cerium, titanium, vanadium, hafnium, tantalum, niobium, chromium, molybdenum, tungsten, and rhenium, and combinations thereof.

13. The process of claim 11 wherein the additive is a complex comprising
a metal oxide selected from the group consisting of alumina, titanium dioxide, zirconium oxide, germania, silica, and ceria, and combinations thereof,
a stabilizer selected from the group consisting of metal ions and metalloid ions, and combinations thereof, and
at least one catalyst different from the stabilizer selected from the group consisting of platinum, palladium, ruthenium, rhodium, osmium, iridium, gold, lanthanum, yttrium, gadolinium, silver, iron, cerium, titanium, vanadium, hafnium, tantalum, niobium, chromium, molybdenum, tungsten, and rhenium, and combinations thereof.

14. The process of claim 11 wherein the additive is polyvinyl pyrrolidone.

15. The process of claim 11 wherein the additive is selected from the group consisting of hydrophobic and hydrophilic particles, carbon black, electrically conductive polymers, pigments, talc, aramid polymers and fluoropolymers.

16. A process for producing a proton exchange membrane comprised of highly fluorinated ion exchange polymer, comprising:
providing a dispersion of a highly fluorinated ion exchange polymer in a first liquid comprised of from 10 to 60 wt % of one or more organic liquids,
atomizing said dispersion to produce droplets of the dispersion,
releasing the dispersion droplets into a heated inert gas,
drying the dispersion droplets in the heated gas to produce polymer particles wherein the polymer particles agglomerate during drying, and the agglomerated particles have a mean diameter in the range of 1 to 100 microns and which agglomerated particles, upon drying, produce flowable particles of highly fluorinated ion exchange polymer, wherein the flowable polymer particles have dry surfaces and an internal residual moisture content in the range of from 4 to 10 wt %,
dispersing said polymer particles in a second liquid to produce a second dispersion of highly fluorinated ion exchange polymer,
forming said second dispersion onto a substrate,
drying the substrate to remove the second liquid from the substrate to provide a proton exchange membrane comprised of the highly fluorinated ion exchange polymer.

17. The process of claim 16 wherein in the step of forming said second dispersion onto a substrate the proton exchange membrane is cast from the second dispersion of highly fluorinated ion exchange polymer.

18. The process of claim 16 wherein the second dispersion of highly fluorinated ion exchange polymer comprises perfluorosulfonic acid and one or more additional fluoropolymers selected from the group consisting of perfluoroalkoxy (PFA), fluorinated ethylene propylene (FEP), low molecular weight polytetrafluoroethylene (PTFE), polyvinylidene fluoride (PVDF), ethylene/tetrafluoroethylene copolymer (ETFE), and ethylene/chlorotrifluorethylene copolymer (ECTFE).

19. The process of claim 18 wherein the proton exchange membrane is a reinforced membrane.

20. A membrane electrode assembly comprising a proton exchange membrane formed by the process of claim 16.

21. A fuel cell comprising the proton exchange membrane formed by the process of claim 16.

22. A process for producing an electrode for a membrane electrode assembly, comprising:
providing a dispersion of a highly fluorinated ion exchange polymer in a first liquid comprised of from 10 to 60 wt % of one or more organic liquids,
atomizing said dispersion to produce droplets of the dispersion,
releasing the dispersion droplets into a heated inert gas,
drying the dispersion droplets in the heated gas to produce polymer particles wherein the polymer particles agglomerate during drying, and the agglomerated particles have a mean diameter in the range of 1 to 100 microns and which agglomerated particles, upon drying, produce flowable particles of highly fluorinated ion exchange polymer, wherein the flowable polymer particles have dry surfaces and an internal residual moisture content in the range of from 4to 10 wt %,
dispersing said polymer particles in a second liquid to produce a second dispersion of highly fluorinated ion exchange polymer,
mixing said second dispersion with catalyst particles and a solvent to from an electrode ink,
forming said electrode ink onto a substrate,
drying the substrate to remove the second liquid from the substrate to provide an electrode having a binder of highly fluorinated ion exchange polymer.

23. A fuel cell comprising an electrode formed by the process of claim 22.

* * * * *